(12) United States Patent
Yu et al.

(10) Patent No.: US 7,206,517 B1
(45) Date of Patent: Apr. 17, 2007

(54) MONITORING AND IN-LINE COMPENSATION OF POLARIZATION DEPENDENT LOSS FOR LIGHTWAVE SYSTEMS

(75) Inventors: Qian Yu, Cupertino, CA (US); Lianshan Yan, Los Angeles, CA (US); Alan E. Willner, Los Angeles, CA (US)

(73) Assignee: University of Southern California (LA), Los Angeles, CA (US)

( * ) Notice: Subject to any disclaimer, the term of this patent is extended or adjusted under 35 U.S.C. 154(b) by 705 days.

(21) Appl. No.: 10/099,875

(22) Filed: Mar. 15, 2002

Related U.S. Application Data (60) Provisional application No. 60/276,799, filed on Mar. 16, 2001.

(51) Int. Cl.
 *H04B 10/00* (2006.01)
(52) U.S. Cl. .................................... 398/152
(58) Field of Classification Search ............. 398/65, 398/136, 140–201
 See application file for complete search history.

(56) References Cited

U.S. PATENT DOCUMENTS

| | | | | |
|---|---|---|---|---|
| 5,127,066 A | * | 6/1992 | Poggiolini | 385/24 |
| 5,327,511 A | * | 7/1994 | Heismann et al. | 385/1 |
| 5,841,557 A | * | 11/1998 | Otsuka et al. | 398/65 |
| 6,396,575 B1 | * | 5/2002 | Holland | 356/73.1 |
| 6,621,067 B2 | * | 9/2003 | He et al. | 250/225 |
| 2002/0109901 A1 | * | 8/2002 | Suh et al. | 359/281 |
| 2003/0175034 A1 | * | 9/2003 | Noe | 398/152 |

OTHER PUBLICATIONS

U.S. Appl. No. 60/230687, filed Sep. 2000, Joseph Sluz.*
U.S. Appl. No. 60/276,799, Qian Yu et al.
Bergano, Neal S. and C. R. Davidson, "Circulating Loop Transmission Experiments for the Study of Long-Haul Transmission Systems Using Erbium-Doped Fiber Amplifiers," Journal of Lightwave Technology, vol. 13, No. 5, pp. 879-888, May 1995.
Haunstein, H. F., and H. M. Kallert, "Influence of PDM on the Performance of Optical Transmission Systems in the Presence of PDL," Technology Digest Optical Fiber Communications Conference (OFC'2001), Paper WT4, pp. WT4-1-WT4-3, Anaheim, CA Mar. 2001.

(Continued)

*Primary Examiner*—Jason Chan
*Assistant Examiner*—David Lee
(74) *Attorney, Agent, or Firm*—Fulbright & Jaworski LLP (57) ABSTRACT

A multi-wavelength optical signal copropagates through a fiber-optic communication link with a continuous-wave ancillary wavelength having an unknown state of polarization (SOP), which is scrambled periodically in time. The instantaneous value of polarization dependent loss (PDL) in the ancillary wavelength is monitored in real time, and is used as an error signal to adjust at least one polarization controller. Polarization scrambling is performed by periodically changing the SOP with time, such that the polarization-scrambled optical signal covers approximately an entire Poincaré sphere surface, preferably uniformly, during each time period. At an optical node between fibers, an adjustable PDL compensator contains two ordered pairs each consisting of one polarization controller and one optical element introducing fixed PDL.

15 Claims, 5 Drawing Sheets

OTHER PUBLICATIONS

Huttner, B., C. Geiser, and N. Gisin, "Polarization-Induced Distortions in Optical Fiber Networks with Polarization-Mode Dispersion and Polarization-Dependent Losses," IEEE Journal of Selected Topics in Quantum Electronics, vol. 6, No. 2, pp. 317-329, Mar./Apr. 2000.

Kim, Na Young, Duckey Lee, Hosung Yoon, and Namkyoo Park, "Analysis on the Limitation of PDM Compensator in the 10 Gbps Transmission System with Polarization Dependent Loss," Technical Digest Optical Fiber Communication Conference (OFC'2001), paper WT6, pp. WT6-2-WT6-4, Anaheim, CA, Mar. 2001.

Lee, S., Q. Yu, S. Yan, Y. Xie, O. H. Adamczyk, and A. E. Willner, "A Short Recirculating Fiber Loop Testbed with Accurate Reproduction of Maxwellian PMD Statistics," Technical Digest Optical Fiber Communication Conference (OFC'2001), Paper WT2, pp. WT2-1-WT2-3, Anaheim, CA, Mar. 2001.

Lichtman, Eyal, "Limitations Imposed by Polarization-Dependent Gain and Loss on All-Optical Ultralong Communication Systems," Journal of Lightwave Technology, vol. 13, No. 5, pp. 906-913, May 1995.

Lu, Ping, Liang Chen, and Xiaoyi Bao, "Statistical Distribution of Polarization-Dependent Loss in the Presence of Polarization-Mode Dispersion in Single-Mode Fibers," IEEE Photonics Technology Letters, vol. 13, No. 5, pp. 451-453, May 2001.

Sun, Y., A.K. Srivastava, J. L. Zyskind, J.W. Sulhoff, C. Wolf and R. W. Tkach, "Fast Power Transients in WDM Optical Networks with Cascaded EDFAs," Electronic Letters, vol. 33, No. 4, pp. 313-314, Feb. 13, 1997.

Poole, Craig D., et al. "Optical Fiber Telecommunications," Academic, vol. 111A, Lucent Technologies, Chapter 6, pp. 114-161, San Diego, 1997.

\* cited by examiner

MONITORING AND IN-LINE COMPENSATION OF POLARIZATION DEPENDENT LOSS FOR LIGHTWAVE SYSTEMS

CROSS-REFERENCE TO RELATED APPLICATIONS

This application claims priority benefit of U.S. Provisional Application 60/276,799 filed Mar. 16, 2001.

STATEMENT REGARDING FEDERALLY SPONSORED RESEARCH OR DEVELOPMENT

The invention was made in part with Government support by Defense Advanced Research Projects Agency (DARPA) under the Air Force Grant Number: F30602-98-1-0196. The Government has certain rights in the invention.

BACKGROUND OF THE INVENTION

High data rate optical fiber communication is one of the fastest growing areas in the telecommunication industry. Compensation of lightwave polarization effects is one of the key enabling technologies for high-speed and long haul data transmission. There has been much interest in the limitations of high-speed lightwave systems caused by the stochastic nature of polarization mode dispersion (PMD). It has become clear recently that polarization dependent loss (PDL) is also a key limiting factor in high-capacity wavelength multiplexing (WDM) systems, because various optical networking components and erbium doped fiber amplifiers (EDFAs) may produce PDL. Further discussion of these factors is found for example in Lichtman, "Limitations imposed by polarization-dependent gain and loss on all-optical ultralong communication systems," *J. Lightwave Technol.*, vol. 13, pp. 906–913, 1995; and Huttner, et al., "Polarization-induced distortions in optical fiber networks with polarization-mode dispersion and polarization-dependent losses," *IEEE J. Selected Topics in Quantum Electron.*, vol. 6, pp. 317–329, 2000.

Some of the deleterious systems issues induced by PDL are: (i) PDL produces a variation in the optical power and signal-to-noise ratio (SNR) of each wavelength channel, (ii) PDL increases the degradation caused by PMD by broadening the distribution of the system power penalty, (iii) given a non-negligible amount of PMD in the transmission fiber, the effects of PDL for many WDM channels will not be correlated with each other, (iv) similar to PMD, the effects of PDL are random and change dynamically in an optical system due to the environment, and (v) PMD compensation becomes much more difficult in the presence of PDL. Therefore, a PDL compensator would be advantageous for high-performance systems.

To date, a functional dynamic PDL compensator has not been demonstrated. Moreover, a practical scheme of fast PDL monitoring that is necessary for dynamic compensation has not been reported. Fast PDL monitoring requires fast polarization scrambling that is independent on the state of polarization (SOP) of incoming optical signals. Existing polarization independent scramblers generate SOP varied non-periodically with time by applying sinusoidal voltages of different frequencies to different waveplates of the scrambler. This scheme limits the PDL measurement time and/or accuracy in the presence of noise.

BRIEF SUMMARY OF THE INVENTION

The present invention is directed to a system and method for real-time compensation of the performance degrading effect induced by polarization dependent loss (PDL) in a multi-wavelength fiber-optic communication system. An optical signal includes a continuous-wave ancillary wavelength having an unknown state of polarization (SOP) substantially central within a plurality of data-modulated wavelengths copropagating through the communication system, where the SOP in the ancillary wavelength is scrambled periodically in time. The instantaneous value of PDL in the ancillary wavelength is monitored in real time, and is used as an error signal to adjust at least one polarization controller.

In some embodiments, polarization scrambling is performed by causing a variation of the SOP as a function of time, and periodically changing the SOP with time, such that the polarization-scrambled optical signal covers approximately an entire Poincaré sphere surface during each time period, preferably uniformly over the entire Poincaré sphere surface. The real-time measured optical signal power variation can be peak-to-peak or root-mean-square.

In some embodiments the fiber-optic communication system includes at least two optical transmission fibers coupled optically in series through at least one optical node, which contains a first optical polarization controller that receives an input optical signal and adjusts the polarization state of the input optical signal to produce a first intermediate optical signal. A first optical element then receives the first intermediate optical signal and causes a fixed polarization dependent loss (PDL) to produce a second intermediate optical signal. A second optical polarization controller then adjusts the polarization state of the second intermediate optical signal to produce a third intermediate optical signal, and a second optical element substantially identical to the first optical element causes a fixed polarization dependent loss (PDL) in the third intermediate optical signal to produce an output optical signal. Each optical node can have an adjustable PDL, which is adjusted to minimize the real-time monitored value of PDL. This configuration is substantially equivalent to a polarization controller followed by a variable PDL element or compensator.

Embodiments of the present invention provide the first demonstration of a practical PDL monitoring scheme and a functional dynamic PDL compensator. They can be used for multi-wavelength, broadband compensation of polarization dependent loss, even in the presence of PMD through transmission fiber. The novel polarization scrambling method ensures fast and accurate in-line monitoring of PDL along a cascaded EDFA link. The applications of this invention include: (i) high bit-rate digital fiber transmission systems; (ii) reconfigurable optical networks; (iii) transmission of analog radio-frequency and millimeter-wave signals over fiber; (iv) dynamic compensation of polarization mode dispersion and polarization dependent loss in high-speed optical communication systems; (v) long-haul optical transmission; and (vi) analog fiber-optic system for wireless communications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For amore complete understanding of the present invention, reference is now made to the following descriptions taken in conjunction with the accompanying drawing, in which.

DETAILED DESCRIPTION

Figure 1:
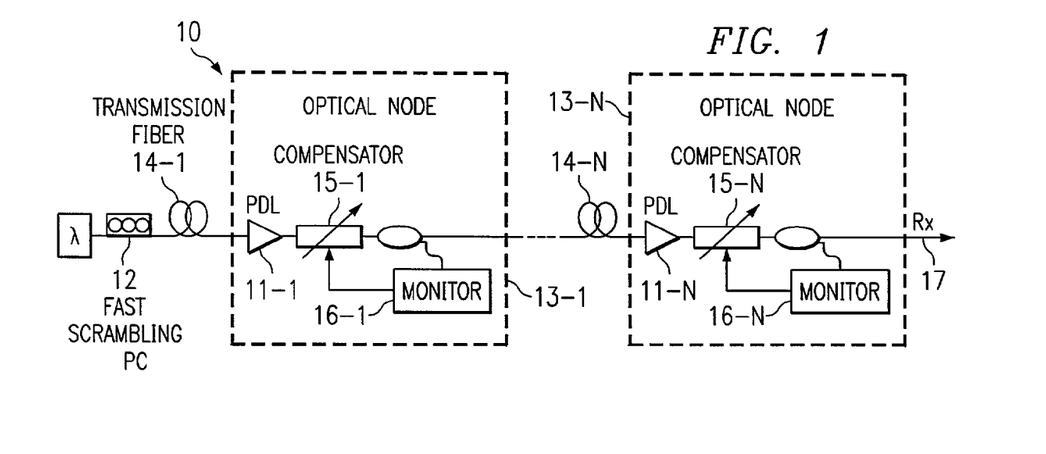
FIG. 1 illustrates in-line monitoring and dynamic compensation of PDL, in accordance with embodiments of the present invention.

FIG. 1 illustrates in-line monitoring and dynamic compensation of PDL, in accordance with embodiments of the present invention. To monitor PDL along a cascaded EDFA link 10 and avoid the influence of EDFA transients, fast polarization scrambler 12 is inserted at the starting point of link 10. The PDL value is obtained from either the peak-to-peak variation or the standard deviation of the photodetected signal power. PDL 11-1, ..., 11-N at every optical node 13-1, ..., 13-N between transmission fibers 14-1, ..., 14-N represents the unavoidable, deleterious polarization dependent loss in various active and passive optical components, for example EDFAs, optical switches, couplers, and/or isolators. Because the polarization coupling between these components may vary with time, the total PDL of the optical module or node 13-1, ..., 13-N is also time-variable, making the dynamic monitoring and compensation of PDL valuable for optimization of overall system performance, as measured at receiver Rx 17. PDL compensation is performed at every optical node 13-1, ..., 13-N by adjusting in-line compensators 15-1, ..., 15-N to minimize the monitored value of PDL at monitors 16-1, ..., 16-N. Broadband compensation for wavelength independent PDL without affecting the data can be realized by scrambling a continuous-wave, ancillary wavelength. The PMD of transmission fiber will not influence the PDL monitoring and compensation. Alternatively, polarization scrambling of modulated data can be used for channel-by-channel compensation of wavelength dependent PDL. Only one scrambler 12 capable of polarization independent scrambling is required for multi-wavelength scrambling for entire link 10.

In a polarization scrambling scheme, according to the present embodiments, the polarization transfer matrix (Jones matrix) of a polarization controller repeatedly scans over a series (typically 100) of random, uncorrelated polarization states. The Jones matrix update frequency is limited by the response time of a polarization controller. Typically, a fiber-squeezer based polarization controller has a response time less than 50 μs, and one measurement of PDL needs only 5 ms. Fast monitoring is necessary for dynamic PDL compensation. The time required for PDL measurement can be further reduced to about 0.1 ms using a $LiNbO_3$ polarization scrambler. Because of the periodic polarization scrambling, the detected power variation due to PDL also varies periodically in the time domain. The technique of periodic signal detection in the presence of noise further improves the PDL measurement accuracy.

The state of polarization (SOP) can be described by three parameters ($s1$, $s2$, $s3$), which are referred to as the "Stokes parameters," such that $s1^2+s2^2+s3^2=1$. As a result, each SOP can be represented by a point on the surface of a sphere of unit radius that is referred to as the Poincaré sphere. A Jones matrix, familiar in the art, is expressed mathematically as $$\begin{bmatrix} \gamma \exp(i\theta_1) & -\sqrt{1-\gamma} \exp(-i\theta_2) \\ \sqrt{1-\gamma} \exp(i\theta_2) & \gamma \exp(-i\theta_1) \end{bmatrix}.$$

A random Jones matrix with y uniformly distributed in the range [0,1], $\theta_1$ and $\theta_2$ uniformly distributed in the range [0, π] transforms an arbitrary given input SOP to a random output SOP uniformly distributed on the Poincaré sphere. A series of such random Jones matrices and the corresponding control voltages of a polarization controller, for example scrambling PC 12, can be computer generated. Except as herein described, the components depicted in FIG. 1 are commodities familiar in the art.

Figure 2:
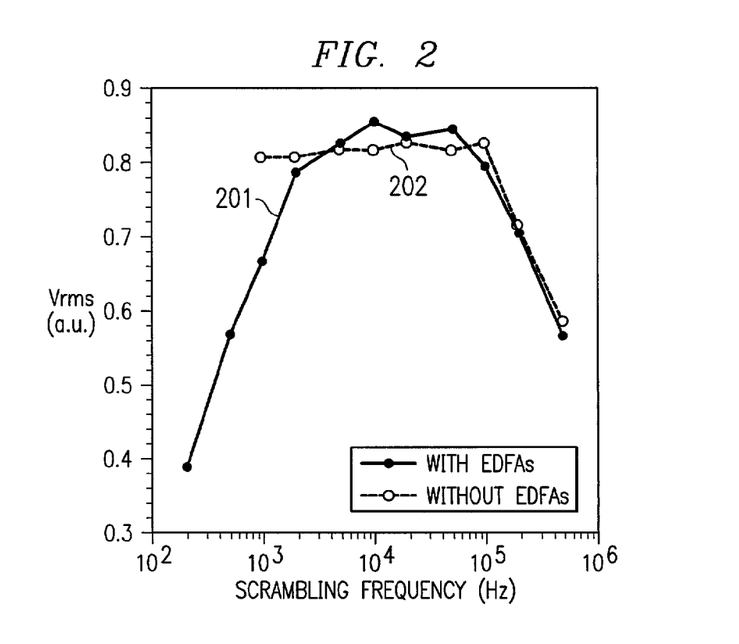
FIG. 2 shows the rms power variation of the monitored signal after passing through a 0.8-dB PDL component as a function of the polarization scrambling frequency in the presence of EDFA.

FIG. 2 shows in curve 201 the rms power variation of the monitored signal after passing through a 0.8-dB PDL component as a function of the polarization scrambling frequency in the presence of EDFA. In the present case, the influence of EDFA transients is suppressed for a scrambling frequency >2 kHz, and the results are consistent with measurements taken for a PDL-generating module that has no EDFAs (i.e., passive module, without EDFA curve 202 in FIG. 2). For scrambling frequencies >100 KHz, both curves roll off due to photodetector frequency response. The measured results show that the rms values provide good agreement in either case. Peak-to-peak power variation may alternatively be used as monitoring data.

Figure 3:
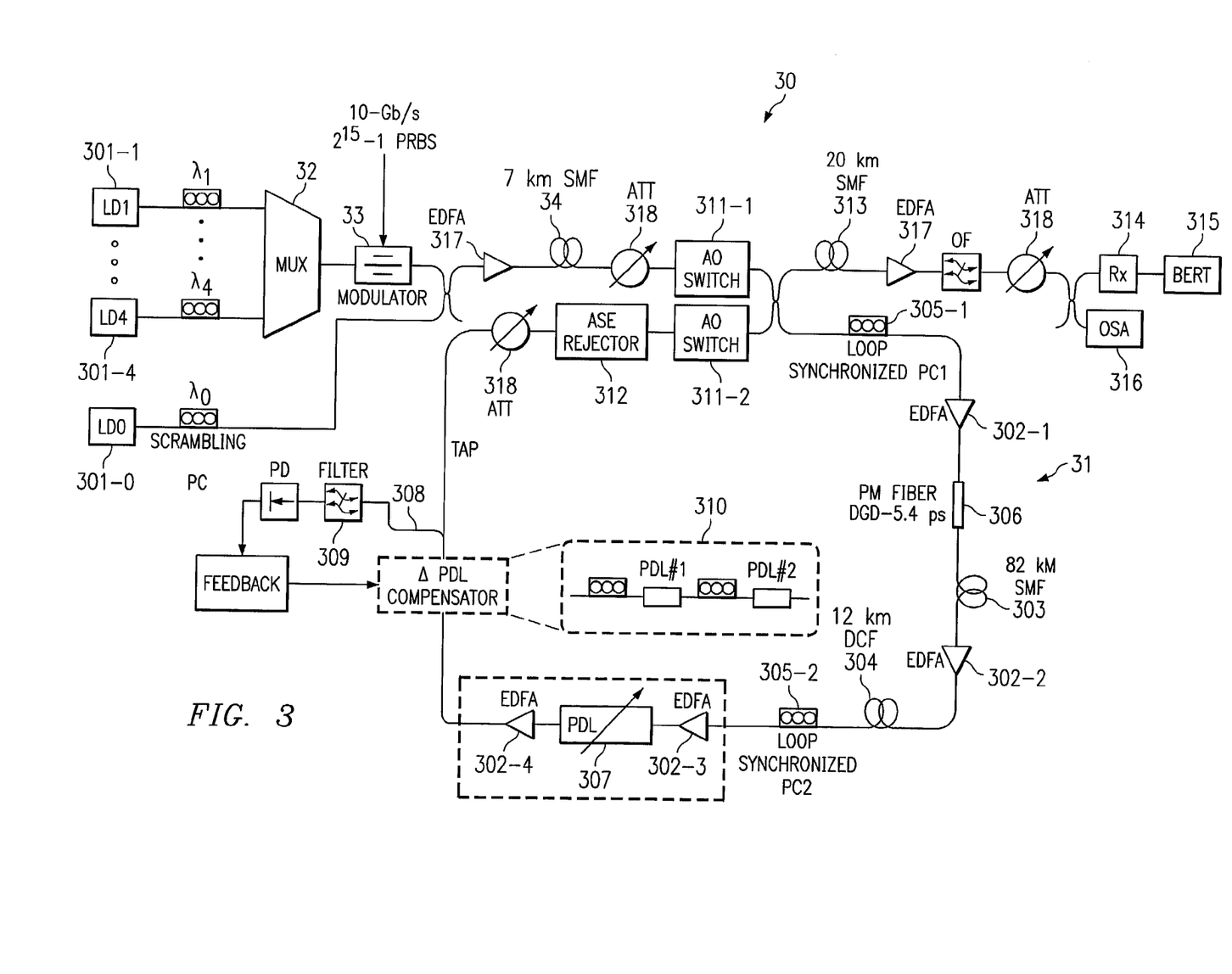
FIG. 3 shows experimental apparatus including a recirculating loop testbed that can closely reproduce a Maxwellian PMD distribution.

FIG. 3 shows experimental apparatus 30 including recirculating loop testbed 31 that can closely reproduce a Maxwellian PMD distribution. Four input channels 301 - 1, ..., 301-4 (1552 nm, 1554 nm, 1556 nm and 1558 nm) are multiplexed at MUX 32 and are modulated at 10 Gbit/s by modulator 33 and decorrelated through 7-km conventional single-mode fiber (CSMF) 34. An ancillary wavelength 301-0 at 1555 nm is used for broadband PDL monitoring and compensation. Dispersion-managed recirculating loop 31 includes four EDFAs 302-1, ..., 302-4 operating in the saturated regime, 82-km of CSMF 303, and 12-km of dispersion-compensating fiber (DCF) 304. Accousto-optic switches 311-1, 311-2 are used to load data into recirculating loop 31 and then allow data to circulate through the loop. Amplified spontaneous emission (ASE) rejector 312 filters out the optical noise from the transmitted signal. After completing the loop transmission, 20-km CSMF 313 is used to further improve the system performance by filtering out the corresponding channel using optical filtering. The bit-error-ratio (BER) at receiver (Rx) 314 is measured using BER test equipment (BERT) 315. Experimental apparatus 30 includes EDFAs 317 and optical attenuators (ATT) 318 which control the optical signal amplitude.

To emulate the statistical distribution of PMD and PDL in real systems, two loop-synchronized polarization controllers (PC) 305-1 and 305-2, polarization-maintaining (PM) fiber 306 with about 5.4 ps differential group delay (DGD), and PDL emulator 307 are used inside the loop. The Jones matrix of each PC 305-1 and 305-2 is updated after every round-trip time of loop 31 to generate a series of random, uncorrelated polarization states during a whole loop running period, determined by loop control circuitry. (For further description of loop testbeds see Yu, et al., "A short recirculating fiber loop testbed with accurate reproduction of Maxwellian PMD statistics," in *Tech. Digest Optical Fiber Communication Conf.* (OFC'2001), paper WT2, Anaheim, Calif., March, 2001; and Bergano et al., "Circulating loop transmission experiments for the study of long-haul transmission systems using erbium-doped fiber amplifiers," *IEEE J. of Light. Tech.*, vol. 13, pp. 879–888, 1995; the disclosures of which are hereby incorporated herein by reference.) Except as described or incorporated herein by reference, components depicted in FIG. 3 are commercially available commodities.

Recirculating fiber loop testbed 30 is used to simulate the transmission performance of a long fiber transmission system by reusing or recirculating an optical signal through a modest length of fiber ranging from tens to hundreds of kilometers. A special technique has been described and demonstrated to ensure that the loop testbed can replicate the statistical distribution of polarization effects in straight-line fiber-optic systems.

The PDL per loop round-trip including PDL emulator 307 is about 0.85 dB. By tapping part of the signals at tap 308 and filtering out the desired wavelength at filter 309, the PDL value along the link is monitored and is adjusted at variable PDL compensator 310 automatically. Variable PDL compensator 310 contains two polarization controllers, each of which preceding a fixed PDL element. Eight passes through loop 31, corresponding to about 800-km transmission, produce about 14-ps arithmetic mean PMD (RMS value=$(8)^{1/2}\times 5.4$ ps) and 2.4-dB average PDL. The described technique applies also to the case with higher PMD values of the transmission fiber, because PMD has no impact on the CW ancillary wavelength. The received optical SNR measured before Rx 314 using optical spectrum analyzer (OSA) 316 at a 0.1-nm resolution bandwidth without PDL inside loop 31 is about 27 dB.

Figure 4:
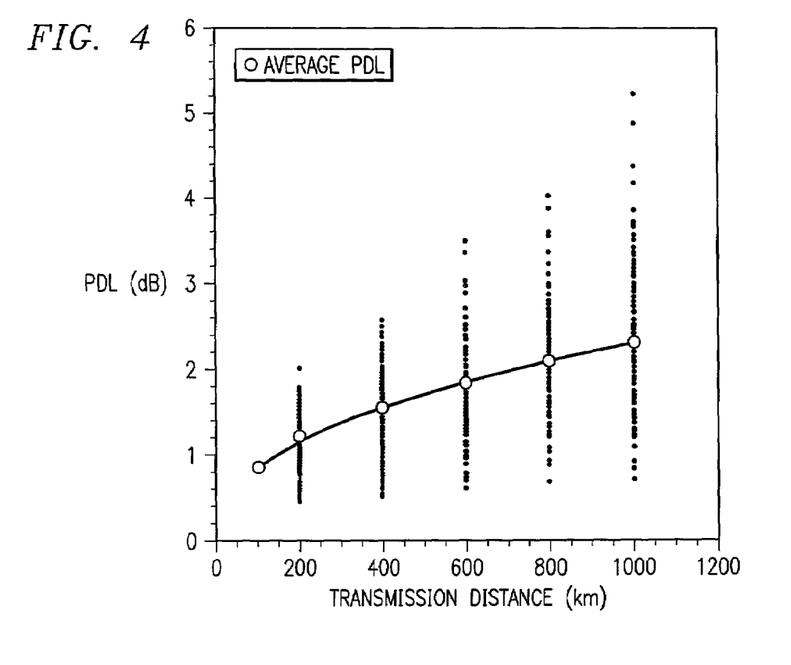
FIG. 4 shows the measured PDL versus transmission distance with inter-loop polarization decorrelation.

FIG. 4 shows the measured instantaneous PDL versus transmission distance with inter-loop polarization decorrelation. The spread of the measured PDL values represents the distribution at 100 independent polarization-coupling states for each corresponding distance. The average PDL value at each distance is calculated from the 100 measured samples. Similar to PMD, the average PDL accumulates according to a square-root dependence.

Figure 5A:
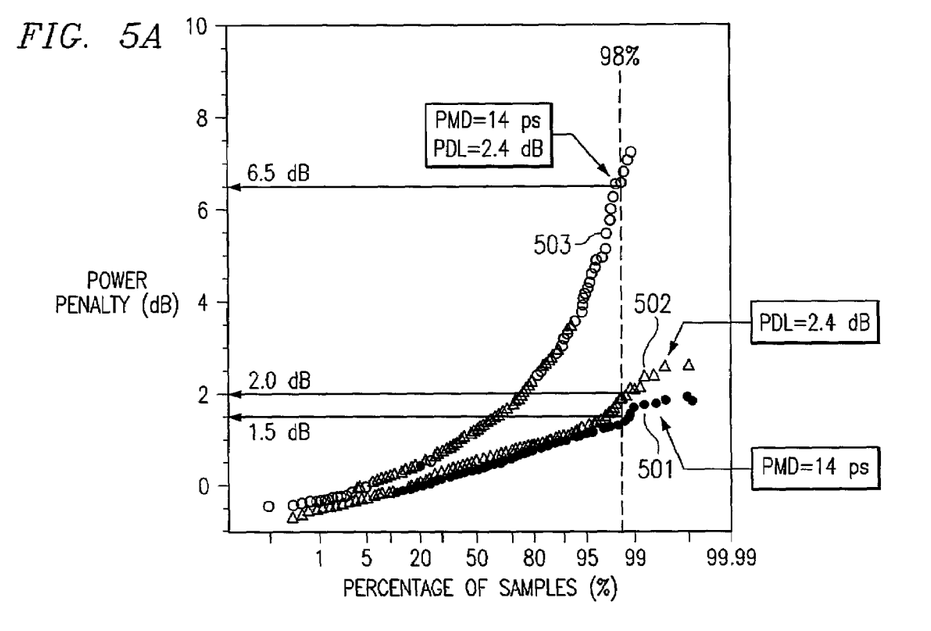
FIG. 5A shows the cumulative probability of power penalties in a 1556-nm channel without PDL compensation.

Power penalties are measured by comparing the receiver sensitivity at a $10^{-9}$ bit-error-rate (BER) with the back-to-back BER through a channel empty of components. FIG. 5A shows the cumulative probability of power penalties in a 1556-nm channel without PDL compensation for: (i) 14-ps average PMD (5.4 ps/loop) with no PDL in curve 501, (ii) 2.4-dB RMS PDL (0.85 dB/loop) with no PMD in curve 502, and (iii) both PMD and PDL as in cases (i) and (ii) combined in curve 503. In case (iii), the 2% tail of the penalty distribution dramatically increases from about 1.5 dB to 6.5 dB after combining 2.4-dB PDL with 14-ps PMD, and error floors occurred for 5 out of 500 samples. As a comparison, 43-ps DGD after the same 800-km transmission with negligible PDL will induce ~4.0-dB power penalty [10]. This serious degradation makes PDL compensation highly desirable.

Figure 5B:
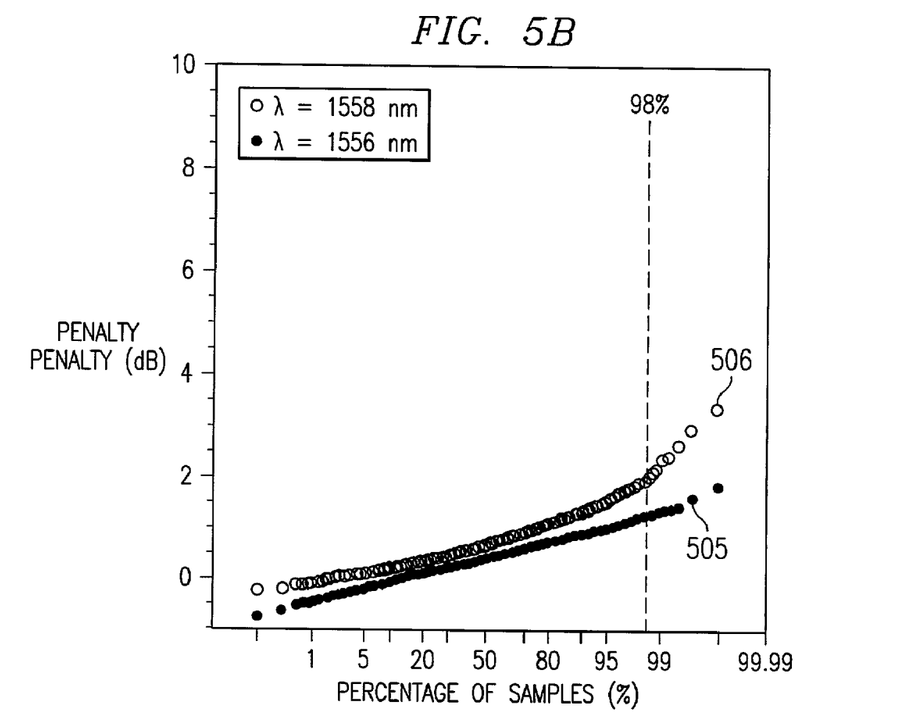
FIG. 5B shows power penalty probability distributions after in-line PDL compensation in the presence of 14-ps average PMD.

The resulting 500-sample power penalty probability distributions after in-line PDL compensation in the presence of 14-ps average PMD are shown in FIG. 5B using a scrambling frequency of 20 kHz. The 2% tail of the power penalty distribution is reduced to 1.4 dB and 1.9 dB for channels separated by 1-nm (1556 nm) in data curve 505 and 3-nm (1558 nm) away from the ancillary wavelength in data curve 506, respectively. The residual penalties are induced mostly by the uncompensated accumulated PMD that takes a reasonably small value. A major wavelength-band limitation of PDL compensation is the PMD of the PDL module, which can induce wavelength-dependent PDL. In addition, compensation of wavelength-dependent PDL can be implemented on a per-channel basis by scrambling the SOP of each modulated data signal in the event that PDL components have high PMD values. Scrambling the SOP of the 1556-nm data channel reduces the 2% tail of the power penalty distribution to ~2.0 dB. In the presence of PMD, scrambling the data channel will incur higher penalties, because the worst-case splitting between two principal states of polarization (PSPs) occurs more frequently. The data demonstrate in-line PDL compensation for optical modules that may produce high PDL. Alternatively, PDL compensation can be applied at the end of the link instead of performing periodic compensation. In this case, multiple-channel PDL compensation can be more difficult, because the PDL compensation bandwidth is limited by the PMD of the whole transmission link. In addition, the interaction of many PMD and PDL elements along the link may necessitate a complicated end-link compensator to account for the interactive effects of PMD and PDL. A compensator using only PMD or PDL elements may not effectively mitigate the channel degradation in this difficult case.

Figure 6A:
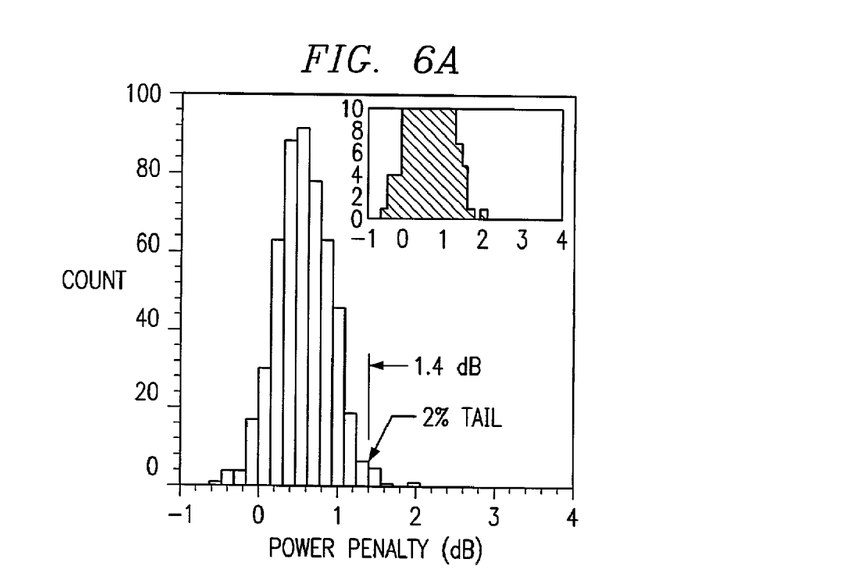
FIGS. 6A–6C are histograms of power penalties obtained from 500 data samples.
Figure 6B:
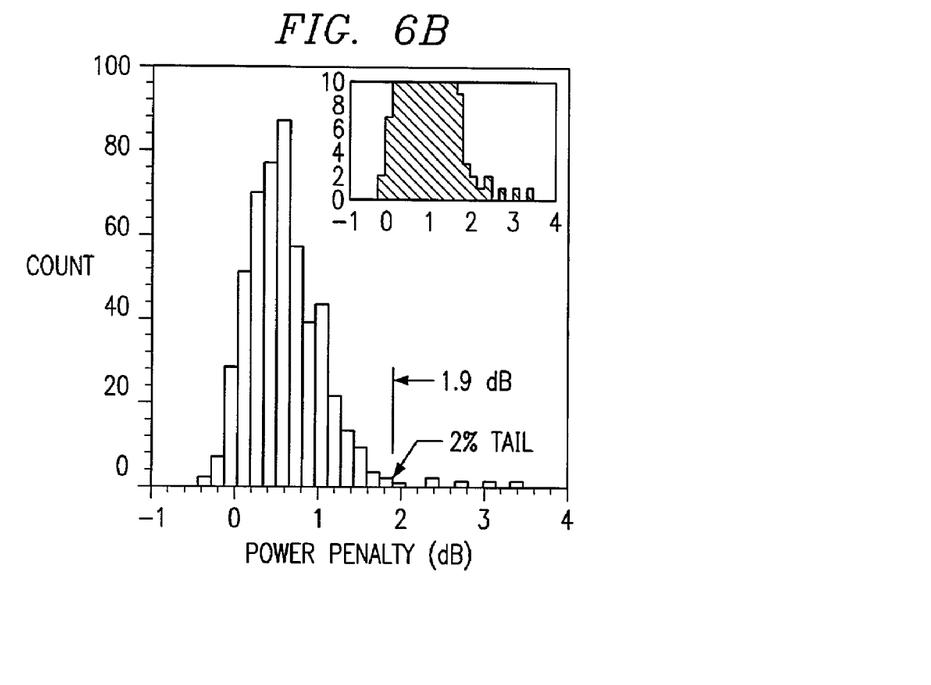
Figure 6C:
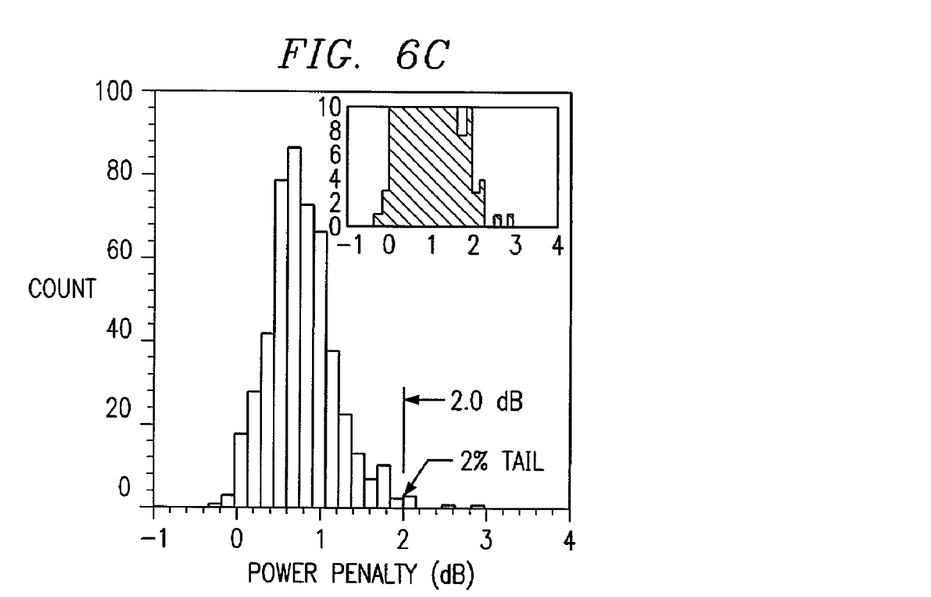

In-line PDL compensation in the presence of 14-ps average PMD is demonstrated by the results shown in FIGS. 6A–6C, where each histogram of power penalties is obtained from 500 data samples. Average PDL without compensation is still 2.4 dB using a dummy wavelength for PDL monitoring located at the center (1555 nm) of the wavelength band, whereas the 2% power penalty is reduced to 1.4 dB (FIG. 6A) and 1.9 dB (FIG. 6B) for the channels 1-nm and 3-nm apart from the dummy wavelength, respectively. The residual penalties are induced principally by PMD. A major limitation of broadband PDL compensation is PMD of the PDL components, but not of the transmission fiber, because PMD can induce wavelength dependent PDL. Given the 0.2-ps of PMD in EDFAs 302-1, . . . , 302-4, PDL compensator 310 can correct for degradations over a wide 6-nm bandwidth. Compensation of wavelength dependent PDL can be implemented on a per channel basis by scrambling the SOP of modulated data. In this case, the 2% power penalty can be reduced to 2.0 dB (FIG. 6C). After in-line compensation of PDL, traditional PMD compensation can then be applied ahead of the receiver.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of polarization-scrambling an incoming optical signal, comprising the steps of:
   causing a variation of the state of polarization (SOP) as a function of time for an incoming optical signal that has an unknown SOP to produce a polarization-scrambled optical signal;
   periodically changing said SOP of said polarization-scrambled optical signal with time, such that said periodically changing polarization-scrambled optical signal covers approximately an entire Poincaré sphere surface during each time period of said periodic changing, over a plurality of periods;
   propagating said periodically changing polarization-scrambled optical signal through a fiber-optic transmission link that contains polarization dependent loss (PDL);
   producing a periodic variation as a function of time of the optical signal power of said polarization-scrambled optical signal propagating through said fiber-optic transmission link; and
   measuring said optical signal power variation in real time.

2. The method of claim 1 wherein said SOP of said periodically changing polarization-scrambled optical signal is distributed substantially uniformly over said entire Poincaré sphere surface during each said time period.

3. The method of claim 1 wherein said real-time measured optical signal power variation is selected from the group consisting of peak-to-peak optical signal power variation and root-mean-square optical signal power variation.

4. The method of claim 1 wherein said optical signal power variation is measured using a photo-detector.

5. The method of claim 1 wherein said fiber-optic transmission link contains at least one component selected from the group consisting of optical fibers and optical amplifiers.

6. A method for real-time compensation of the performance degrading effect induced by polarization dependent loss (PDL) in a multi-wavelength fiber-optic communication system including at least one adjustable polarization controller, said method comprising the steps of:
   transmitting a continuous-wave ancillary wavelength substantially central relative to a plurality of data-modulated wavelengths through said communication system together with said plurality of data-modulated wavelengths, said continuous-wave ancillary wavelength having an unknown state of polarization (SOP),
   scrambling the SOP in said continuous-wave ancillary wavelength periodically in time;
   monitoring in real time the instantaneous value said PDL in said continuous-wave ancillary wavelength; and
   adjusting said at least one adjustable polarization controller in response to said real-time monitored instantaneous PDL value.

7. The method of claim 6 wherein said step of scrambling further comprises the steps of
   causing a variation of the SOP as a function of time in said continuous-wave ancillary wavelength to produce a polarization-scrambled continuous-wave ancillary wavelength; and
   periodically changing said SOP of said polarization-scrambled continuous-wave ancillary wavelength with time, such that said periodically changing polarization-scrambled continuous-wave ancillary wavelength covers approximately an entire Poincaré sphere surface during each time period of said periodic changing.

8. The method of claim 7 wherein said SOP of said periodically changing polarization-scrambled continuous-wave ancillary wavelength is distributed substantially uniformly over said entire Poincaré sphere surface during each said time period.

9. The method of claim 7 wherein said step of monitoring further comprises the steps of:
   propagating said periodically changing polarization-scrambled continuous-wave ancillary wavelength through a fiber-optic transmission link that contains polarization dependent loss (PDL);
   producing a periodic variation as a function of time of the optical signal power of said polarization-scrambled continuous-wave ancillary wavelength propagating through said fiber-optic transmission link; and
   measuring said optical signal power variation in real time.

10. The method of claim 9 wherein said real-time measured optical signal power variation is selected from the group consisting of peak-to-peak optical signal power variation and root-mean-square optical signal power variation.

11. The method of claim 9 wherein said optical signal power variation is measured using a photo-detector.

12. The method of claim 9 wherein said fiber-optic transmission link contains at least one component selected from the group consisting of optical fibers and optical amplifiers.

13. The method of claim 9 wherein said continuous-wave ancillary wavelength together with said plurality of data-modulated wavelengths propagate through a fiber-optic transmission link comprising at least two optical transmission fibers coupled optically in series through at least one optical node, wherein said at least one node contains:
   a first optical polarization controller having an input port operable to receive an input optical signal having, a polarization state, said first optical polarization controller being operable to adjust the polarization state of said input optical signal to produce a first intermediate optical signal;
   a first optical element coupled to said first polarization controller and operable to receive and to cause a fixed polarization dependent loss (PDL) in said first intermediate optical signal to produce a second intermediate optical signal;
   a second optical polarization controller coupled to said first optical element, said second optical polarization controller being operable to adjust the polarization state of said second intermediate optical signal to produce a third intermediate optical signal; and
   a second optical element substantially identical to said first optical element, said second optical element being operable to receive and to cause a fixed polarization dependent loss (PDl) in said third intermediate optical signal to produce an output optical signal.

14. The method of claim 13 wherein said at least one optical node has an adjustable PDL.

15. The method of claim 14 wherein said step of adjusting further comprises adjusting said first and second polarization controllers in said at least one optical node to minimize said real-time monitored value of PDL.

* * * * *